April 23, 1946.  A. S. FISK ET AL  2,398,824
FILTER STRUCTURE
Filed Dec. 17, 1941
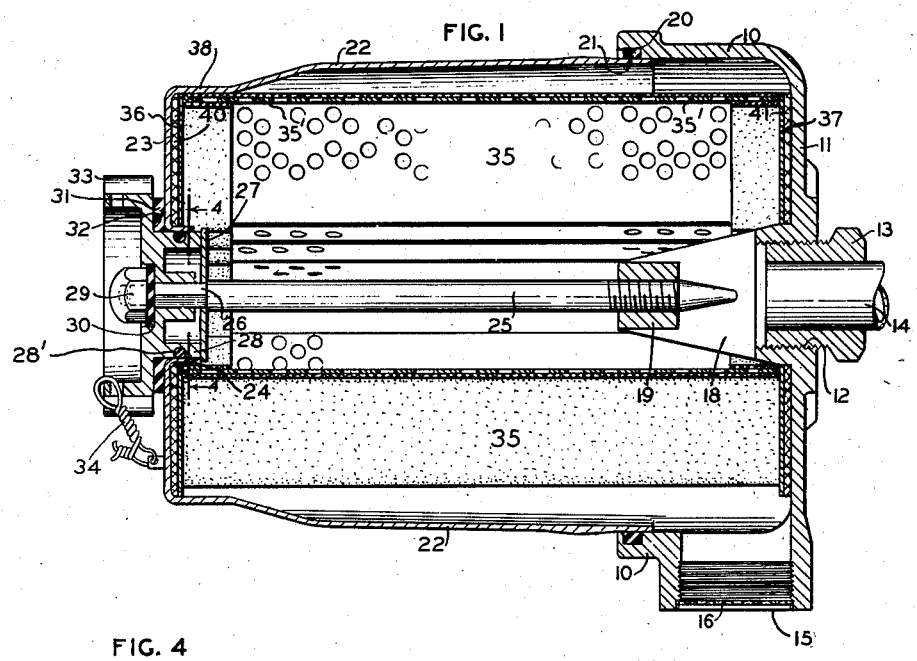
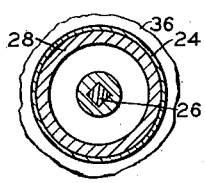
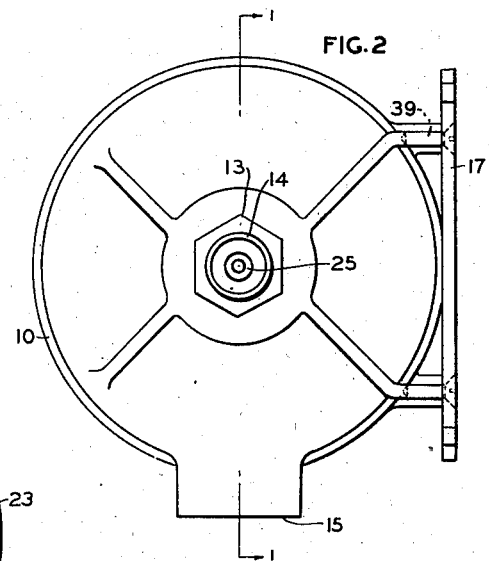
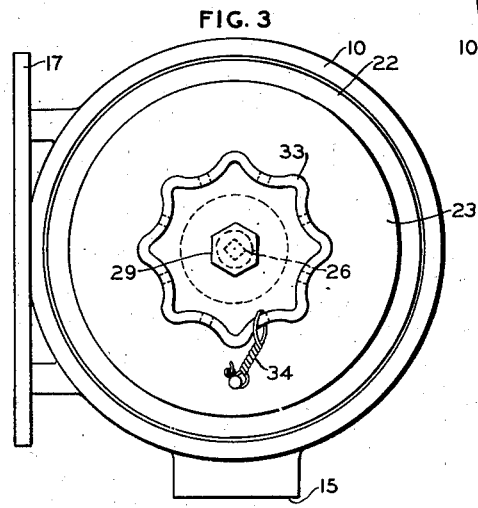
INVENTORS
ALBERT S. FISK, &
JULIUS P. KOVACS;
BY
THEIR ATTORNEY Patented Apr. 23, 1946

2,398,824

UNITED STATES PATENT OFFICE 2,398,824

FILTER STRUCTURE

Albert S. Fisk, Brooklyn, N. Y., and Julius P. Kovacs, Newark, N. J., assignors to Purolator Products, Inc., Newark, N. J., a corporation of Delaware Application December 17, 1941, Serial No. 423,278

1 Claim. (Cl. 183—73)

This invention relates to filter structures.

An object of the invention is to provide a filter element containing structure from which the filter may be easily removed for replacement in a minimum of required space.

One of the features of the invention resides in the utilization of a two-part casing structure for receiving the filter element having a connecting means therefor by which both the casing parts and the filter element are simultaneously secured in position.

Another feature of the invention is provided by the structural arrangements employed for preventing the accumulation of water within the filter structure due to condensation therein of the moisture content of the gas, such as air, being filtered.

A further feature of the invention consists in the means employed for accounting for variances in the length of different filter elements used in the structure.

Still another feature of the invention resides in the provision of a removable casing part for the filter structure on which the filter element is initially placed in a correct position for mounting within the structure.

Other objects, features and structural details of the invention will be apparent from the following description when read in connection with the accompanying drawing, wherein:

Fig. 1 is a vertical longitudinal cross section of the improved filter structure taken on line 1—1, in Fig. 2.

Fig. 2 is a front end elevation of the filter structure as shown in Fig. 1.

Fig. 3 is a rear end elevation, and

Fig. 4 is a detail cross section taken on line 4—4, in Fig. 1.

With reference to the drawing, the illustrated embodiment of the improved filter structure shows the same as being formed to include a hollow casing which is constructed in two parts. Both of these parts are tubular in shape and have oppositely disposed closed end portions between which the filter element of the structure is positioned when the parts are connected. The cylindrical casing part designated at 10 has an end closing wall 11 provided with a central tapped opening 12 in which a centrally open fastening piece 13 is mounted. Piece 13 provides an outlet or exhaust port for the filter structure, the same being included in casing part 10 and being shown as screw-connected to the end of a pipe 14 from which air or other gaseous medium is continually being withdrawn by suitable means not herein shown and not forming a part of the present invention. This portion of the casing is also constructed to include an inlet or entrance port 15 by which the gaseous medium to be filtered is permitted to enter the filter structure. A screen 16 may be employed at the mouth of the port 15 by which large contaminating particles contained in the moving substance are prevented from entering the structure. If desired, the gaseous medium can be led to the entrance port 15 through means of a suitable pipe connection (not shown) from the outside of a pressure cabin within which the structure may be located.

A removable mounting plate member 17 screw-connected to the tubular body of the casing part 10 is provided for suitably securing this part of the structure in a fixed position on the front of a wall or bulkhead (not shown). With the plate 17 removed, the casing part 10 may be secured to the bulkhead from the opposite side thereof by means such as the screws 39. Casing part 10 is preferably fixed in position by the mounting member 17 with the entrance port 15, situated as shown in the drawing, in which the same is located in the lowermost position of the structure. As illustrated, the axis of the tubular casing part is horizontally located and consequently port 15 is located at the disposed bottom or base portion of the tubular casing 10. The outlet pipe 14, once it is connected to the fastening piece 13, need not subsequently be disconnected when it is necessary to renew the filter element contained within the improved structure. Also, it will be appreciated that it is unnecessary to disturb the fixed mounted position of the casing part 10. A central lug 18 extends from the interior portion of casing part 10 and contains a screw-threaded opening 19 therein in axial alignment with the axis of the tubular body 10, the same providing a portion of the connecting or screen fastening means employed to join the respective casing parts. The lug 18 is cut out to provide communication between the interior of the casing and the pipe 14. An internal groove 20 in the casing part 10 provides a seat for an annular resilient member 21 which contacts the exterior surface of the removable part of the two-part casing filter structure.

The other part of the two-part tubular casing is designated at 22, the same having a circular end closing wall 23 and an inwardly disposed central flange forming portion 24 providing an opening which is concentric to the axis of this part of the structure. The means for effecting closure of the casing parts at their telescopically fitting respective open ends includes, in this instance, a threaded pin 25 which extends along the coaxially arranged extending axes of the respective casing parts and engages the threaded opening 19 in the central lug 18 at one end thereof. The opposite end of the extending pin 25 includes a portion of square cross section as designated at 26 which contains thereon a slidable washer 27 and slidable centering member 28, the peripheral surface of which fits in the circular opening defined by the inwardly extending flange 24 of the casing part 22. An end nut 29 and washer 30 are fastened to the pin 25 and confine the slidable parts 27 and 28 thereon. Preferably, the member 28 is provided with a peripheral groove in which is seated an annular resilient member 28' which contacts the inner surface of the flange 24.

An outside washer 31 is situated on the peripheral surface of the centering member 28 and is positioned between the outside of the end closing wall 23 of casing part 22 and a flange area 32 provided by an enlarged outside diameter extending portion 33 of the centering member 28. Portion 33 is fluted as clearly shown in Fig. 3 so that the same may be readily turned by hand to effect rotation of the pin 25 and the desired properly fitted connection of the respective parts of the casing as hereinafter described. When the fluted portion or knob has been set in the desired position, a safety wire 34 may be employed to connect the knob with the casing part 22 which must be disconnected before a change of the filter element within the structure can be made. The interior of the casing part 22 is bell-shaped and the portion of the same which is situated in the lower or base of the structure slopes in the direction of the entrance port 15, as clearly shown in Fig. 1.

The filter element designated at 35, is preferably tubular in shape and includes flat end walls 36 and 37 which engage the surfaces of resilient washers 40 and 41, respectively. Washers 40 and 41 engage the circular end walls 23 and 11 of the casing parts 22 and 10, respectively. The filter element which is constructed of any suitable filtering material may, for example, be formed as a wire mesh shell 35' on which a paper covering is provided, the same being situated in the structure between the entrance and exhaust ports and providing a desirable filter element for air which is the movable substance particularly adapted for use in the improved structure.

In operation, filtered air is drawn from the central core opening within the filter element 35, which extends its entire length, into the exhaust pipe 14. Air entering the structure through port 15 surrounds the peripheral exterior surface of the filter element 35 which may be of any desirable formation. The filter element is positioned within the structure with its axis coinciding with the common axis of the two casing parts 10 and 22. The closed end portion of the removable casing part 22 is reduced in diameter, as indicated at 38, and serves the purpose of initially holding the filter element 35 at the end 36 thereof in a proper position to be mounted. When the filter element 35 is to be replaced by a new one, the wire seal 34 is first broken and the knob portion 33 turned so as to disengage the pin 25 from the threaded opening 19 in the lug 18. The initial turning movement will release the pressure on washer 31 and bring washer 27 to engage the inner surface of flange 24 without altering the interior assembly of the parts.

Further turning movement of the knob 33 will then effect disengagement of the telescopically joined casing part 22 from fixed casing part 10. When the parts are free, it is only necessary to move the filter element 35, a distance corresponding to the axial length of the fixed casing part 10 before it is entirely parted from the mounting. After a new filter element has been placed in the removable casing part 22, the structure is reassembled by a reverse procedure, the limited slidable engagement of the parts afforded by the centering piece 28 permitting a degree of flexibility therein to accommodate for variances in the exact length of different filter elements 35. The connecting means employed also facilitates simultaneously positioning of the filter element therein and joining of the respective casing parts 10 and 22.

The filter element 35 has one end fitting snugly into the smaller diameter section of the casing part 22 so that the casing part and filtering element may be moved as a unit in assembling the casing part 22 with the casing part 10 or removing the casing part 22 from the casing part 10. The filtering element in co-operation with the central lug 18 serves to position the casing part 22 axially of the casing part 10 and guide the edge of the casing part 22 into the casing part 10. Such action is accomplished by insertion of the lug 19 into the central passageway of the filter 35 when the casing part 22 is being moved toward the casing part 10. After the two parts are assembled, the filtering element 35 serves to support the casing part 22, thereby permitting such casing part to be made from thin metal.

The location of the entrance port 15 in the structure prevents the accumulation of water within the casing parts due to condensation therein of the moisture content of the air.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

The filtering element illustrated herein is of the type covered by the patent to L. W. Williams, No. 2,218,800 and preferably such type filtering unit is employed. However, the invention is not limited to the structure of the filtering element and any form of a central passage type filtering element may be employed instead of the filtering element stated.

Having described our invention, what we claim and desire to secure by Letters Patent is:

A filter structure comprising a casing composed of a first part and a second part telescopically engaged, an inlet port and an outlet port for said casing, a tubular filtering element concentrically positioned within said casing and held therein by the engagement of its respective ends with the closed end portions of the joined casing parts, a nut member rigidly attached to said first casing part, an aperture in said second casing part, a rotatable member arranged in said aperture and having a head of larger area than said aperture exterior of said casing and a non-circular bore, a screw member threaded into said nut member and having a reduced non-circular portion fitting said bore and terminating in a shoulder, a nut threaded onto the end of said screw and engaging said head, and a washer within said second casing part having a non-circular aperture snugly but slidably receiving the non-circular portion of said screw and engageable by said shoulder, said washer being of larger area than said aperture whereby axial movement of said screw by rotation thereof in said nut member brings said washer into engagement with said second casing part to retract it from said first casing part.

ALBERT S. FISK.
JULIUS P. KOVACS.

Certificate of Correction

Patent No. 2,398,824.                                                                           April 23, 1946.

ALBERT S. FISK ET AL.

It is hereby certified that error appears in the printed specification of the above numbered patent requiring correction as follows: Page 1, second column, line 50, for the word "lifting" read *fitting*; and that the said Letters Patent should be read with this correction therein that the same may conform to the record of the case in the Patent Office.

Signed and sealed this 4th day of June, A. D. 1946.

[SEAL]

LESLIE FRAZER,
*First Assistant Commissioner of Patents.*